United States Patent
Aubert

[15] 3,641,624
[45] Feb. 15, 1972

[54] CARCASS SEPARATION

[72] Inventor: Georges Aubert, 6 rue Pierre Dupre, Marseille, France

[22] Filed: July 28, 1969

[21] Appl. No.: 845,456

[30] Foreign Application Priority Data

July 7, 1968 France.....................................22359
Sept. 11, 1968 France.....................................22385

[52] U.S. Cl....................................................17/23
[51] Int. Cl.............................................A22c 17/06
[58] Field of Search......................................17/23

[56] References Cited
UNITED STATES PATENTS 1,492,333  4/1924  Law et al.............................17/23
2,634,457  4/1953  Moyer et al..........................17/23
3,402,425  9/1968  Wexel...................................17/23
3,402,426  9/1968  Wexel...................................17/23

Primary Examiner—Lucie H. Laudenslager
Attorney—William Anthony Drucker

[57] ABSTRACT

An apparatus for cutting carcass of butchers' meat into two portions has means for engaging each side of the thoracic cage of the carcass and for forcing said sides apart, and a cutting device arranged to move longitudinally between said cage-engaging means to cut the backbone of the carcass along its entire length.

5 Claims, 4 Drawing Figures

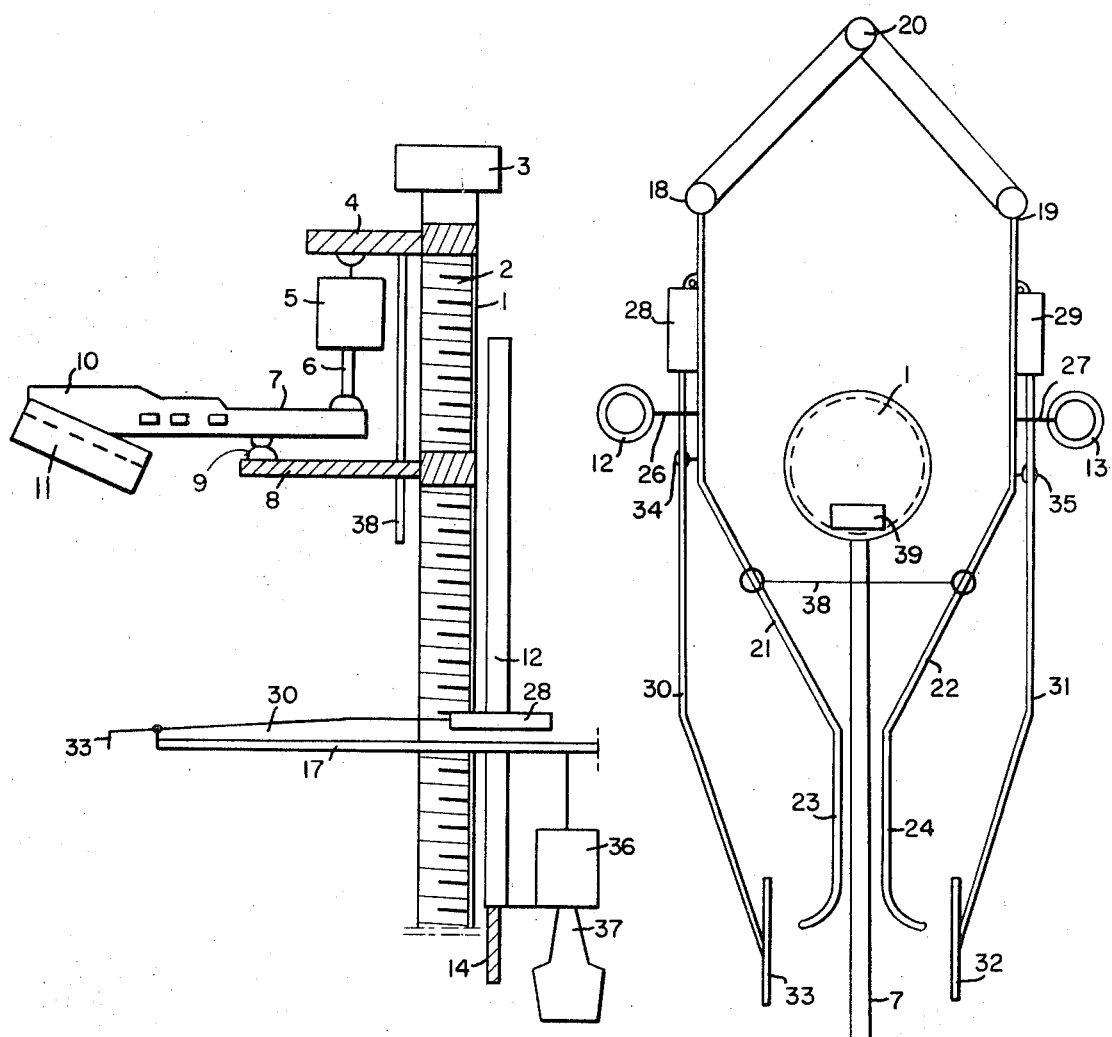

INVENTOR:
GEORGES AUBERT

CARCASS SEPARATION

The invention consists of the construction of an instrument designed to divide butchers' meat carcasses into two by vertical cutting of the backbone, including bones as well as fleshy parts.

It features the means used, taken either together or separately, and in particular the combination of the cutting equipment which moves vertically, driven by an endless screw which imparts a downward movement to the stock bearing the knife, while the blade undergoes an alternating rocking movement, imparted by a jack or eccentric; and the separating equipment, it being specified that separation is obtained by gripping the inside and outside parts of the thoracic cage by means of articulated rods which hold back the close-together parts of the animal's forequarters, previously opened, and allow the rod bearing the blade to go through right to the opposite end of the carcass.

On the attached drawings, given as a nonlimiting example of one of the forms of construction of the invention:

FIG. 1 shows a longitudinal section of the instrument as a whole,

FIG. 2 shows the separator device seen from above,

Figure 3:
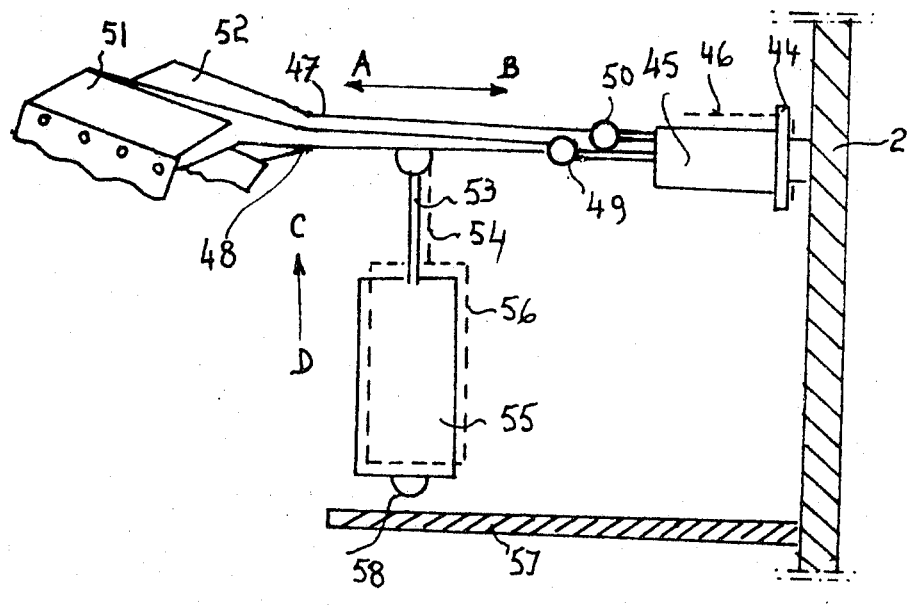
FIG. 3 shows the drive of the twin stabilization device.

The instrument is made up of a vertical framework or column 1 inside which there is an endless screw 2 driven by a reducing motor 3.

SPREADING AND CUTTING

On this endless screw there is a stock made up of an arm 4 bearing a jack 5 the driving shaft 6 of which is connected to the rocker rod 7 mounted on the arm 8. This rod oscillates on the support 9 and rod 7 comprises, at the end, an adjustable blade-holder 10, on which the blade 11 is positioned at a specific slant.

This stock unit of FIG. 1 moves along the column 1 on the arms 4, 8.

On either side of the column 1 there are tubular uprights 12 and 13 which are supporting and guiding tubes for the spreader device.

The arms 16 and 17 are fixed on these uprights and their ends 18, 19 are connected to the swingle-bar 20. Their forward parts 21 and 22 are angled and extended by close-together penetrating portions 23, 24 ending in outwardly angled spreading sections.

These arms, articulated on the uprights 12, 13, oscillate on the shafts 26, 27 connecting them to the aforesaid uprights 12 and 13.

The jacks 28 and 29 operating the bars 30, 31 are fixed on the arms 16, 17. The end of these bars is fitted with press or push devices 32, 33.

Small rods 34, 35 connect these bars to the arms 16, 17.

A spreader guide 38 slides along the portions 21, 22 and holds the latter in the required position.

CHOPPING

The stock 44 (FIG. 3) bears the pneumatic to-and-fro chopper device 45, 46 operating the rods 47, 48 articulated at 49, 50 and bearing cutters 51, 52 with interchangeable blades. These rods are connected by vertical small rods 53, 54 to the pneumatic to-and-fro devices 55, 56 mounted on the arms 57 by means of the articulations 58.

Figure 4:
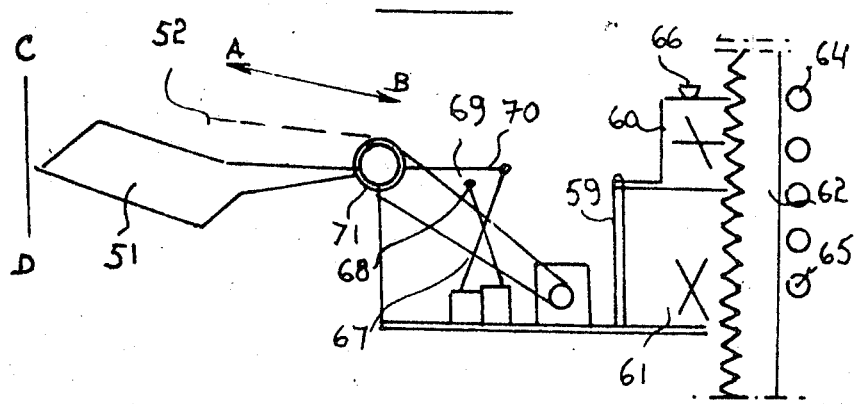
FIG. 4 shows the stabilization of the driving device.

The mobile stock bearing the chopper device FIGS. 3–4 is fitted with gear wheels or toothed wheels 60, 61 which notch on the toothed rack 62.

The opposite face 63 is smooth and serves as a track for the stabilizing rollers 64, 65 or others. The driving motor 66 moves the unit. The knives 51, 52 are driven in a constructional variation by small rods 67, 68 and the eccentric 71.

As shown in FIG. 3 the rods 47, 48 move to-and-fro, arrows A B, and up and down, C D.

The blades 51, 52 strike the same point in accordance with a specific alternation, in view of their converging slant.

The double gear wheels 60, 61 combined with the rollers 64, 65 provide a degree of stability which is not always present in endless screws.

The working of this instrument can thus be understood.

POSITIONING

The carcass to be cut longitudinally is positioned facing the column 1, the back limbs at the top and the front limbs at the bottom; a support (not shown) then keeps it in position and the knife 11, moving from top to bottom and helped by the sloping angle, cuts the carcass at the same time as the endless screw lowers the point of impact.

SPREADING

Simultaneously, the spreader rods 16, 17 are inserted by their ends 23, 24 into the open inside part of the carcass on a level with the breastbone.

The rods 30, 31 by means of their push rod compress the outer faces which are thus gripped between the rods 30, 23 and 31, 24.

The compensation bar 20 receives a thrust which separates the rods 16, 17 while the tubular bearer pillars 12, 13 by means of the axles 26, 27, also turn on their bearings 14, 15 thus effecting the symmetrical separation of the arms. The jacks 28, 29 position the rods 31, 30 under pressure by means of the small rods 34, 35 and segments 42, FIGS. 2, 5.

CUTTING

Cutting is facilitated and centered by the separator device which enables the carcass to be completely divided into two parts.

By operating the adjusting jacks 37, the jack 36 and the endless screw 2, the instrument can be adjusted to any size of carcass (FIG. 1).

Successive blows, like the movement of an axe, divide the backbone and flesh of the carcass, which ends up cut automatically into two equal parts.

This instrument can be fixed or mobile, i.e., mounted on a movable base.

I claim:

1. Apparatus, for cutting carcasses of butchers' meat into two portions, which comprises means for engaging each side of the thoracic cage of a carcass and forcing said sides apart, and a cutting device arranged to move longitudinally between said cage-engaging means to cut the backbone of the carcass along its entire length, wherein said cutting device comprises a pair of converging cutter assemblies positioned side by side and each including a cutter element adopted to deliver successive blows and respective means for reciprocating said cutter element along the direction of cut.

2. Apparatus, as claimed in claim 1, wherein the cage-engaging means comprise a pair of pivoted arms engaging between the sides of the thoracic cage, a hydraulically operable gripper element mounted movably on each arm and adapted to grip the portion of cage positioned between it and the arm on which it is mounted, and toggle means connected to said arms for moving them equally and oppositely.

3. Apparatus, as claimed in claim 1, wherein the cutting device comprises a longitudinal feed screw, a stock meshed with and movable longitudinally by the feed screw, and a cutter assembly carried by the stock.

4. Apparatus, as claimed in claim 3, wherein the cutter assembly comprises a cutter element pivotably mounted on the stock, and means connected between the stock and the cutter element for reciprocating the cutter element.

5. Apparatus, as claimed in claim 1, comprising a separator wedge carried by the cutting device and positioned to follow the line of cut.

* * * * *